United States Patent
Lee et al.

(10) Patent No.: US 10,261,848 B2
(45) Date of Patent: Apr. 16, 2019

(54) DECODER ARCHITECTURE FOR QUANTUM ERROR CORRECTION

(71) Applicant: Turing Inc., Berkeley, CA (US)

(72) Inventors: Jonathan Lee, Berkeley, CA (US); Michele Reilly, Berkeley, CA (US)

(73) Assignee: Turing Inc., Berkeley, CA (US)

( * ) Notice: Subject to any disclaimer, the term of this patent is extended or adjusted under 35 U.S.C. 154(b) by 72 days.

(21) Appl. No.: 15/685,378

(22) Filed: Aug. 24, 2017

(65) Prior Publication Data
US 2019/0065299 A1  Feb. 28, 2019

(51) Int. Cl.
*G06F 7/02* (2006.01)
*H03M 13/00* (2006.01)
*G06F 11/07* (2006.01)
*G06N 99/00* (2019.01)

(52) U.S. Cl.
CPC ...... *G06F 11/0751* (2013.01); *G06F 11/0706* (2013.01); *G06N 99/002* (2013.01)

(58) Field of Classification Search
CPC ............. G06F 11/0751; G06F 11/0706; G06N 99/002
See application file for complete search history.

(56) References Cited

U.S. PATENT DOCUMENTS

2011/0133770 A1* 6/2011 Przybysz ............... B82Y 10/00
326/5
2016/0344414 A1* 11/2016 Naaman ............ H03M 13/1575

* cited by examiner

*Primary Examiner* — Samir W Rizk
(74) *Attorney, Agent, or Firm* — Proskauer Rose LLP

(57) ABSTRACT

A system for locating errors for quantum computing includes an interface, a shift array, a comparison block, a tree pipeline, and a serializer. The interface is configured to receive a set of quantum bit values, wherein the set of quantum bit values comprise a subset of quantum bit values in a quantum bit array. The shift array is configured to store a prior set of quantum bit values read from identical quantum bit locations at a prior time corresponding to the set of quantum bit values. The comparison block is configured to identify differences between the set of quantum bit values and the prior set of quantum bit values. The tree pipeline configured to rank the differences identified. The serializer is configured to serialize the differences identified in order by rank.

20 Claims, 17 Drawing Sheets

QuBit Array Locations Time=t0

| 1 | 5 | 9  | 13 | 17 | 21 | 25 | 29 |
|---|---|----|----|----|----|----|----|
| 2 | 6 | 10 | 14 | 18 | 22 | 26 | 30 |
| 3 | 7 | 11 | 15 | 19 | 23 | 27 | 31 |
| 4 | 8 | 12 | 16 | 20 | 24 | 28 | 32 |

FIG. 6A

QuBit Array Locations Time=t1

| 1 | 5  | 9'  | 13 | 17   | 21 | 25' | 29   |
|---|----|---------|----|------|----|---------|------|
| 2 | 6' | 10 | 14 | 18   | 22 | 26      | 30' |
| 3 | 7  | 11' | 15 | 19' | 23 | 27      | 31   |
| 4 | 8  | 12      | 16 | 20   | 24 | 28      | 32   |

FIG. 6B

DECODER ARCHITECTURE FOR QUANTUM ERROR CORRECTION

BACKGROUND OF THE INVENTION

Topological Quantum Computing is a promising scheme for achieving general quantum computation. Such schemes store single logical qubits in a lattice of physical qubits, and use quantum measurement and purely classical error correction to preserve the logical qubits in the face of experimental conditions. This permits logical qubits to be preserved for substantially longer than the typical coherence time of the physical qubits.

To achieve this, it is necessary to measure classical ancilla bits and perform a complex classical error correction in times commensurate with the coherence time of the physical qubits. In applications, this may require handling ~$10^3$ physical qubits and measuring an ancilla bit from each of them at ~$10^6$ Hz. However, the data processing required is thus at the scale of gigabits/second, which exceeds feasible processing rates for commercial general-purpose processors.

BRIEF DESCRIPTION OF THE DRAWINGS

Various embodiments of the invention are disclosed in the following detailed description and the accompanying drawings.

FIGS. 6A and 6B are tables illustrating an example of data locations in an embodiment of a quantum bit array.

DETAILED DESCRIPTION

Figure 1:
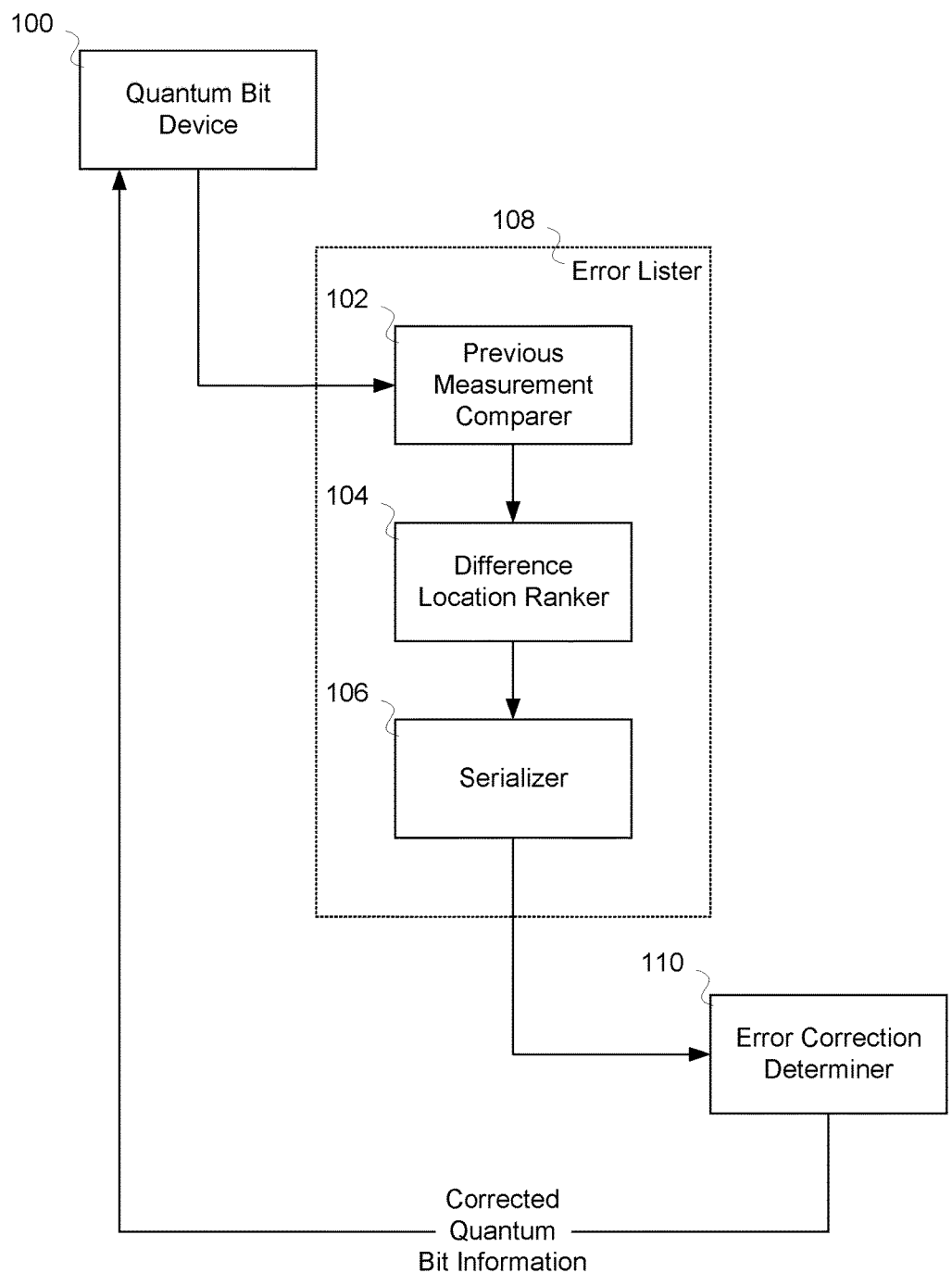
FIG. 1 is a block diagram illustrating an embodiment of a system for locating errors for quantum computing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for locating errors for quantum computing is disclosed. The system comprises an interface, a shift array, a comparison block, a tree pipeline, and a serializer. The interface is configured to receive a set of quantum bit values, where the set of quantum bit values comprise a subset of quantum bit values in a quantum bit array. The shift array is configured to store a prior set of quantum bit values read from identical quantum bit locations at a prior time corresponding to the set of quantum bit values. The comparison block is configured to identify differences between the set of quantum bit values and the prior set of quantum bit values. The tree pipeline is configured to rank the differences identified. The serializer is configured to serialize the differences identified in order by rank.

The system for locating errors for quantum computing processes quantum bit values using dedicated hardware structures to rapidly identify changes in the quantum bits between read out of the quantum bits. This enables the use of quantum bits for computing by increasing their stability over time. The quantum bits are stored in a bit array (e.g., an array of quantum bits with N rows and M columns). The bits are read out and compared as a set of bits in parallel using a shift register to easily compare the current readout of the set of bits with the last readout of the set of bits. For example, the first column of the array is read into a first register of a shift array, then the second, then the third, up to the $M^{th}$ column, and then the first column is read again and compared to the previous stored first column in the shift array to detect any differences in the bit values. This newly read first column is then shifted into the shift array and the second column is read again and compared to the previous stored second column in the shift array to detect any differences in the bit values. This continues as the quantum bit array is repeatedly read out and compared to its last readout that is stored in the shift array. This structure enables rapid comparisons without the overhead of a random access memory.

Since the probability of a change in the bit values is low (e.g., in the range of $10^{-3}$-$10^{-4}$), the location of a difference within the quantum bit array and the associated time the difference was identified can be reduced to a much smaller amount of information. The location within a subset of the array (e.g., a column of the quantum bit array) is reduced to a ranked list using a tree pipeline. A pipelined set of binary trees is used to filter down the subset of the array to a list of locations and times. The subset of the array is input to the binary tree and the tree moves the input data through its structure according to a set of rules. The tree is then copied to the next tree in the pipeline and again the data moves through its structure according the set of rules and so on for the length of the pipeline. The output of the tree is stored in a ranked order so that a first difference appears at a first difference location, a second difference appears at a second location, etc. The binary tree can identify when it has moved all differences to the ranked difference locations. In the case where no differences are input, then the pipelined set of binary trees can indicate that there no differences almost immediately. The more differences that are in the input subset of the array, the longer the pipelined set of binary trees takes to move all of the differences into the ranked difference location outputs. However, the trees can indicate when all of the differences are ready.

The ranked difference location outputs and the associated times, can then be provided in parallel or serialized to an error correction determiner. The error correction determiner can correct any errors that it identifies and provide this information back to correct the quantum bit array.

FIG. 1 is a block diagram illustrating an embodiment of a system for locating errors for quantum computing. In the example shown, quantum bit device 100 includes a quantum bit array for a quantum computation system. The values of the bit array are read out (typically as a row or a column or some linear array unit at a time) and sent to previous measurement comparer 102 of error lister 108. Previous measurement comparer 102 compares the values of the bit array in parallel with previous values read for the same location. The difference are determined based on the comparison and passed to difference location ranker 104 along with corresponding location within the array and the time associated with the reading of the bit. Difference location ranker 104 lists the differences on a ranked list and passes the outputs to serializer 106. Serializer 106 outputs just the difference locations and associated time information to error correction determiner 110. Error correction determiner 110 determines appropriate corrected quantum bit information, which in turn is sent back to quantum bit device 100 for correcting of the bits. Note that ideally the correction of the bits in quantum device 100 should be performed without significant delay from the time of detection of any difference to maintain validity of any processing performed using the quantum bit array for a quantum computation calculation.

Figure 2:
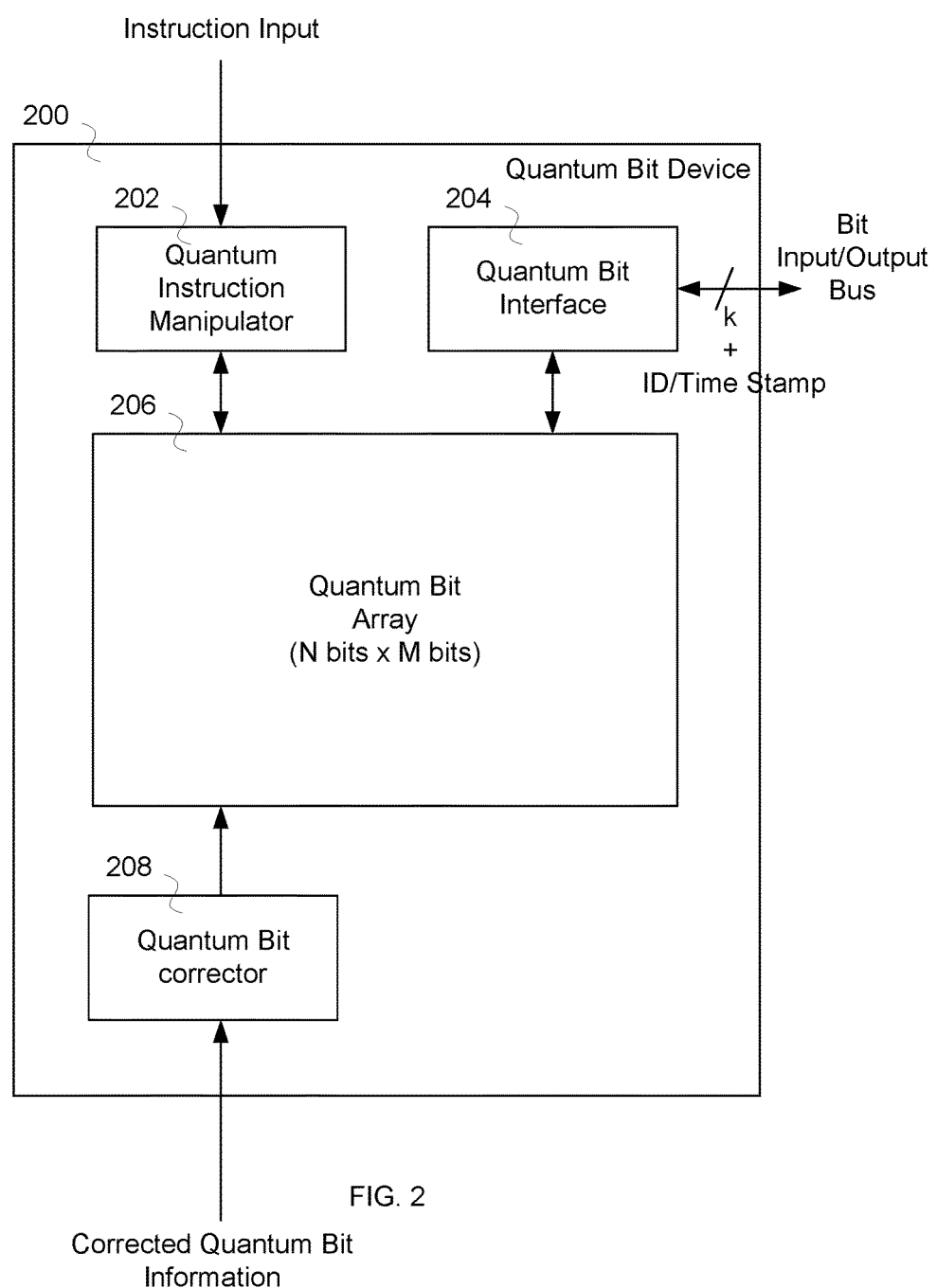
FIG. 2 is a block diagram illustrating an embodiment of a quantum bit device.

FIG. 2 is a block diagram illustrating an embodiment of a quantum bit device. In some embodiments, quantum bit device 200 is used to implement quantum bit device 100 of FIG. 1. In the example shown, quantum bit device 200 includes quantum bit array 206 (e.g., N bits by M bits) that is able to be written to or read from using quantum bit interface 204. Quantum bit interface 204 includes a parallel output interface that is k bits wide and is also able to provide identifier information indicating the location(s) of the quantum bit within quantum bit array 206 as well as the time information for when the values were read. In various embodiments, k bits is able to hold a row or a column of quantum bit array 206, is able to hold a a fraction of a row or a column of quantum bit array 206, or any other appropriate subunit of quantum bit array 206. Also, corrected bit information can be used to correct bits in quantum bit array 206 using quantum bit corrector 208. For computation, quantum instruction manipulator 202 manipulates bits in quantum bit array 206 in response to received computation instructions.

Figure 3:
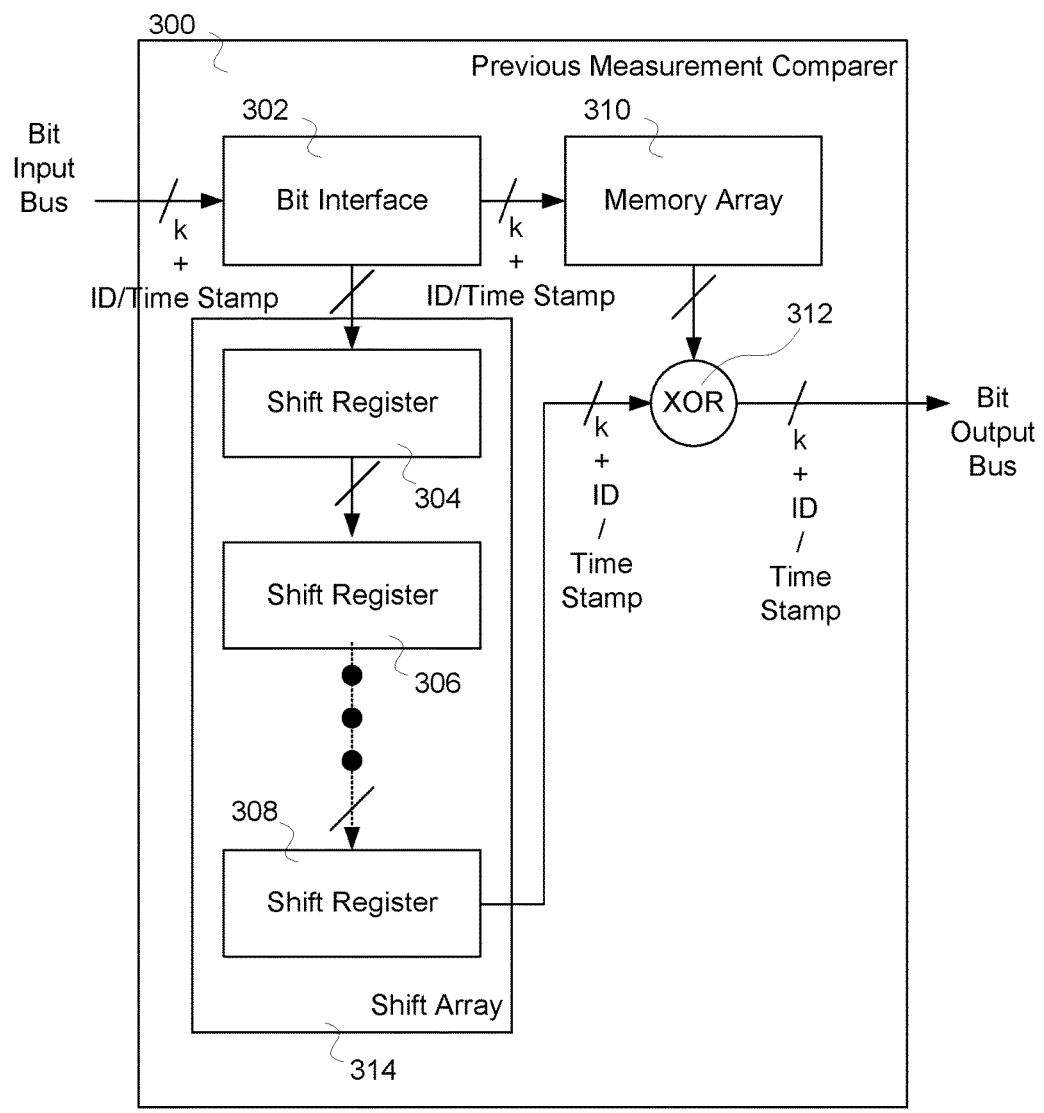
FIG. 3 is a block diagram illustrating an embodiment of a previous measurement comparer.

FIG. 3 is a block diagram illustrating an embodiment of a previous measurement comparer. In some embodiments, previous measurement comparer 300 is used to implement previous measurement comparer 102 of FIG. 1. In the example shown, bit interface 302 of previous measurement comparer 300 receives input bits and location information as well as time stamp information. The received input bits (and location/time information if necessary) are loaded into shift register 304 of shift array 314 as well as to memory array 310. Shift array 314 shifts values on the next input received to shift register 306 (e.g., on a clock edge, on an input value being presented, etc.) and so on. Shift array 314 holds values associated with the quantum bit array so that the shift register 308 holds prior read values corresponding to the same locations as are held in memory array 310. The current values (in memory array 310) are compared to prior values (in shift register 308) using XOR 312. The locations of any differences are indicated at the output of XOR 312 (an array of outputs with a '1' for difference for any of the bits in shift register 308 and memory array 310 and a '0' for no difference). These output values are output on a bit output bus.

In some embodiments, memory array 310 is part of shift array 314 (e.g., the first register in shift array 314). In some embodiments, the k bits in a linear array read from the quantum bit array are an integer multiple of the entire quantum bit array so that k×j=M×N bits of the quantum bit array, where j is a number of the linear arrays needed to read in the entire quantum bit array. In various embodiments, k=M or k=N. In some embodiments, the linear array with the k bits has a number of bits that is a power of 2. In some embodiments, the number of expected differences in the linear array is much less than half the size of the linear array (e.g., number of differences $\ll$k/2).

Figure 4:
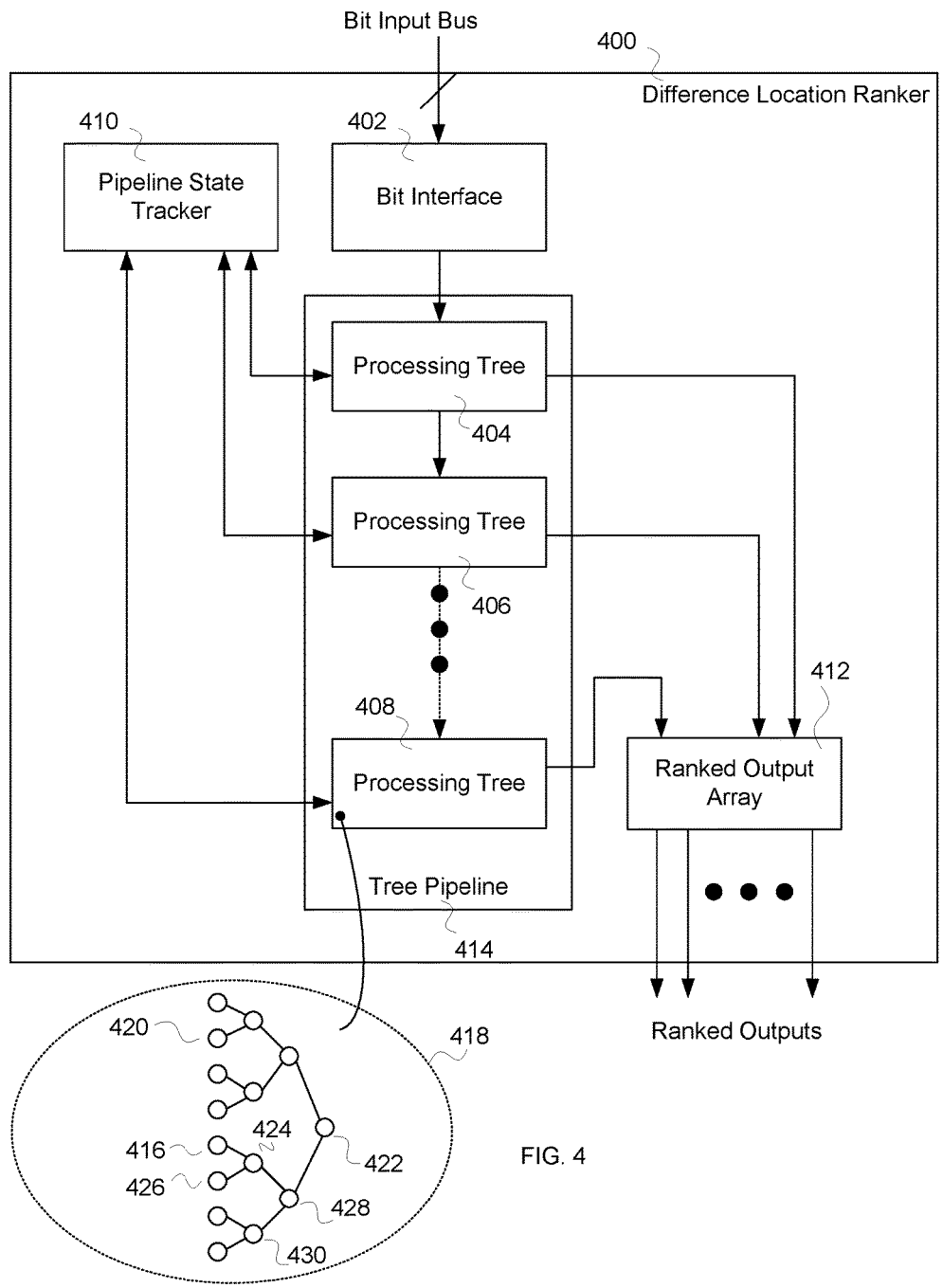
FIG. 4 is a block diagram illustrating a difference location ranker.

FIG. 4 is a block diagram illustrating a difference location ranker. In some embodiments, difference location ranker 400 is used to implement difference location ranker 104 of FIG. 1. In the example shown, bit interface 402 receives input bits from a previous measurement comparer that identifies differences in a quantum bit value in a quantum bit array as well as the location within the array and a time marker associated with the reading of the bit value. The differences are input to processing tree 404 (part of tree pipeline 414) that outputs the differences identified in a ranked output array and signals when the output is ready. Identified differences are moved within the processing tree on a clock cycle according to rules and the tree is copied to a next tree in tree pipeline 414 until the ranked output array includes the identified differences it is designed to display. Processing tree 404, processing tree 406, processing tree 408, etc. are designed to handle a certain percentage of inputs that have identified differences. The probability that the identified difference can be handled appropriately can be driven to a desired goal (e.g., an error rate of $10^{-18}$) but may still make errors in the event of large bursts of differences being inputted into the tree. Pipeline state tracker 410 is able to identify when all the difference values have been ranked for output (e.g., processing tree includes no more differences to be moved to the output array).

Each processing tree (e.g., processing tree 404, processing tree 406, processing tree 408, etc.) includes a binary tree similar to inset 418 (here shown with only 8 leaf nodes for inputs). The binary tree in inset 418 includes leaf node 420 and root node 422. For the binary tree in inset 418, node 424 has child0 node 416, child1 node 426, parent node 428, and sibling node 430. When L bits are input into the leaf node (e.g., where the L bits are transported across the k-bit wide bus from the quantum device), there is an indication of a difference (e.g., each of which indicates a difference if and only if the ancilla measurement at the associated position has changed with a '1' or a qubit identifier or address and/or a time). The L bits are processed into a small collection of positions that have changed. As the errors are independent, the number of these errors can be modeled by a Binomial(L, error rate) distribution. Unconditional tail bounds can be given for this distribution, such that we need only guarantee correctness up to some fixed count s<<L of errors (e.g., s=9).

Each node of the binary tree stores a value in 1 . . . L and a flag is full. Each non-leaf node has two children child0 and child1. Each non-root node has a parent, a sibling, and is said to have priority if it is child0 of its parent.

In the example below, the leaves are numbered 1 . . . L, and leaf ii is set to be full and store the value ii if the associated bit of input is 1. The value ii can be mapped to a quantum bit array location using information associated with the difference indication received. All other nodes are initially set to be empty. The tree outputs a value from root node 422.

The binary tree processes its values by simultaneously updating all the nodes as follows:

IF(NODE.ISFULL)
    IF(NODE IS ROOT)
        OUTPUT(NODE.VALUE)
        NODE.ISFULL=FALSE
    ELSEIF((!NODE->PARENT.ISFULL)&&(NODE.PRIORITY||
        (!NODE->SIBLING.ISFULL)))
        NODE.ISFULL=FALSE
ELSEIF(NODE IS NOT A LEAF)
    IF(NODE->CHILD0.ISFULL)
        NODE.ISFULL=TRUE
        NODE.VALUE=NODE->CHILD0.VALUE
    ELSEIF(NODE->CHILD1.ISFULL)
        NODE.ISFULL=TRUE
        NODE.VALUE=NODE->CHILD1.VALUE

Note that the flow control of the above code depends on the isfull state of at most five nodes (itself, its parent, its sibling, and its children), and precomputable constants. In FPGA implementations, this is particularly efficient as the logic can be encoded in a single look up table. Additionally, it can be proved that if $\log_2 L=kk$, and there are c errors, then these c locations output in ascending order in the kk+1, kk+3, . . . , kk+2c−1'th iterations of the function.

Since the updates are simultaneous, the processing is pipelined by storing kk+2s copies of all nodes, with each iteration of the function moving values from the ij'th copy of each node to the ij+1'th copy of each node. As a corollary, after pipelining there are s outputs, with the property that if a value is put into output ij>1 at some time t, then a value must have been put into output ij−1 at time t−2. In some embodiments, the output $i \in \{1 \ldots s\}$ is taken to be a shift register of length 2(s−ij) connected to a queue—these queues are simultaneously clocked, such that all queues are advanced together; if no error location is pushed into a queue then that queue holds a magic flag value NULL.

Figure 5:
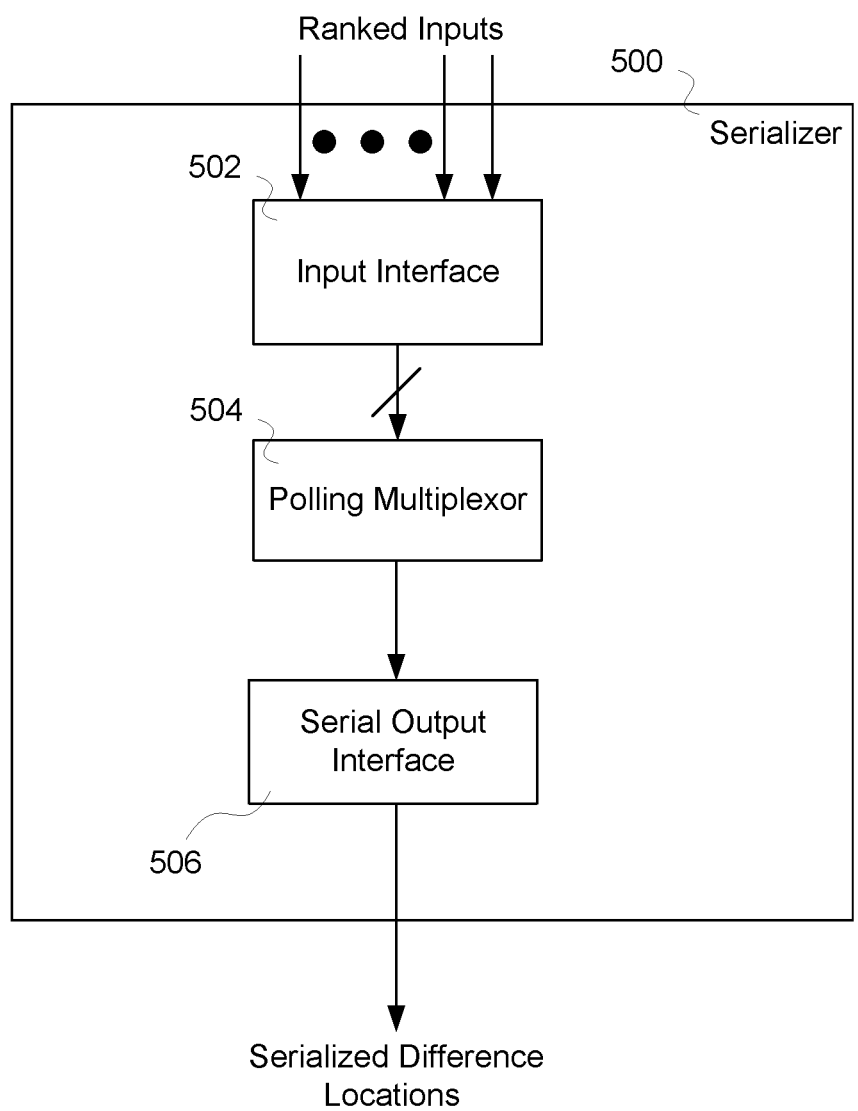
FIG. 5 is a block diagram illustrating an embodiment of a serializer.

FIG. 5 is a block diagram illustrating an embodiment of a serializer. In some embodiments, serializer 500 is used to implement serializer 106 of FIG. 1. In the example shown, ranked inputs are received by input interface 502 and these are passed to polling multiplexor 504. Serializer 500 also receives an indication that the ranked inputs are ready as the amount of time (e.g., number of clock cycles) that it takes for the ranked inputs to appear can vary. Polling multiplexor 504 serializes the ranked inputs and outputs these using serial output interface 508. The outputs are used to determine a corrected set of bits and this information can be used to correct bits in the quantum bit array.

In some embodiments, the input is received from a set of s queues numbered 1 . . . s, with the property that the error locations found from any set of L positions are stored in ascending order in a subset 1 . . . c of the queues. In this case the serialization can be performed by running an algorithm:

VAL=PEEK(QUEUE X)
IF(VAL==NULL)
    X=0
    POP ALL QUEUES
ELSE
    OUTPUT VAL
    X=X+1
    IF X=C+1
        X=1 where the internal value x is initialized to 0. By construction, the outputs from this function will be the positions of all errors found. Additionally, a run of the function only fails to output a value if it has checked a queue and found there are no more errors to output from a set of L input positions. Hence the full set of errors from the N×M initial physical qubits is output in $(N \times M)L^{-1}$+number of errors iterations of this function. Since modifications to x must be made before the next peek, the second branch of this function may take 2 clock cycles to run. Hence the total time taken is at most $(N \times M)L^{-1}$+2×number of errors clock cycles. Thus, unlike the previous blocks, serializer 500 is not capable of processing a full N×M bits of a single measurement in $NL^{-1}$ clock cycles, unlike the previous measurement comparer or the difference location ranker. One simple solution is to process a fresh L bits of input every other clock cycle. The maximum length of queue required between the second and third stages to ensure that the probability of error is negligible is straightforwardly computed. As an alternative, one can ingest a fresh L bits of input on a fraction p>½ of the clock cycles, so long as L×error rate×p<1−p. Essentially, this states that in expectation the final stage is able to output all errors, and so with suitably sized queues the probability that the final stage will be a bottleneck can be made negligible. In fact, simulation of a version of this design on commercially available FPGAs indicates an ability to perform filtering for 65K physical qubits at a 700 KHz quantum clock speed. Equivalently, it was able ingest data at 48 Gbps, consuming <20% of any resource on the FPGA. These capabilities substantially meet or exceed requirements for near term quantum computation. The simulation handled 64 bits of error in a parallel fashion, so the binary tree has 64 leaves, which in this case are used to store the lower 6 bits of each error position within the quantum bit array. The higher bits of the position and the time are stored in information that is carried along with each of the 64 bits that are input. Each specific error location is then determined using the lower 6 bits and the higher bits carried along for the entire input array. The number of errors designed for was 9, which tolerates a simulated error rate of $10^{-3}$ with a failure probability of $1.44 \times 10^{-19}$. The clocking was fixed for the difference location ranker and serializer 500; between the difference location ranker and serializer 500, the simulation includes a FIFO queue which takes an input only when the first ranked output of the processing trees finds an error. Since serializer 500 on average removes elements from these queues faster than they are added, the maximum depth of the queue by 15 is bound.

In some embodiments, serializer 500 is not used and the ranked inputs are input in parallel directly to an error correction determiner. In this case, the L input bits can be processed at the same clock rate as the earlier stages.

FIGS. 6A and 6B are tables illustrating an example of data locations in an embodiment of a quantum bit array. In some embodiments, the quantum bit array corresponds to a quantum bit array of a quantum bit device (e.g., quantum bit device 100 of FIG. 1). In the example shown, N×M bits are shown; in the figure, N×M=32 quantum bit locations are shown in 4 rows of 8 columns. A quantum bit array could, of course, be of any N×M size and the size selected for these Figures is for illustration purposes only and does not represent any special design or design choice. FIG. 6A shows a location identification number within the quantum bit array corresponding to a time=t0. FIG. 6B shows the location identification number within the quantum bit array corresponding to a time=t1 with prime and bolded notation indicating that the value in the identified location has changed from time t0 to t1.

Figure 7:
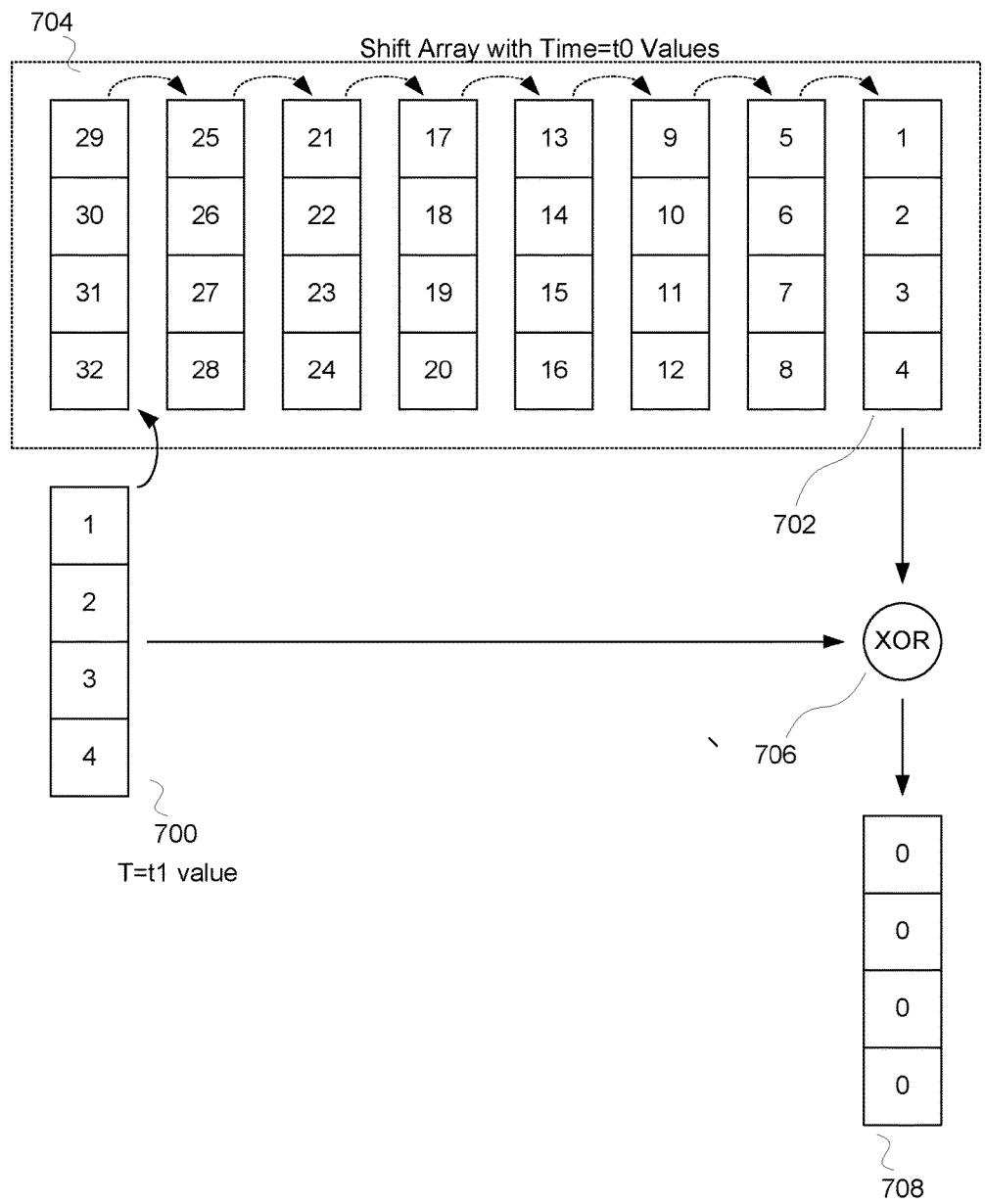
FIG. 7 is a block diagram illustrating an embodiment of a previous measurement comparer's operation.

FIG. 7 is a block diagram illustrating an embodiment of a previous measurement comparer's operation. In some embodiments, the operation shown in FIG. 7 is illustrative of the operation of previous measurement comparer 300 of FIG. 3. In the example shown, a set of data is received as input—in this Figure shown as column 700 of T=t1 value is input and it is compared (using parallel XOR 706) to the last column 702 of shift array 704. Shift array 704 inputs each column and these are shifted through shift array 704 until the column appears at the far right. The column when it arrives at the fir right is at the appropriate time to be compared to the corresponding input column of values taken from the same location in the quantum bit array, but at a later time. Output column 708 has a '0' value for no change and '1' for a change. The position in the output column with information regarding the associated quantum bit identifier and time can uniquely identify the changed bit in the quantum bit array of the quantum bit device. Shift array 704 is shown with position values of FIG. 6A associated with time=t0.

Figure 8:
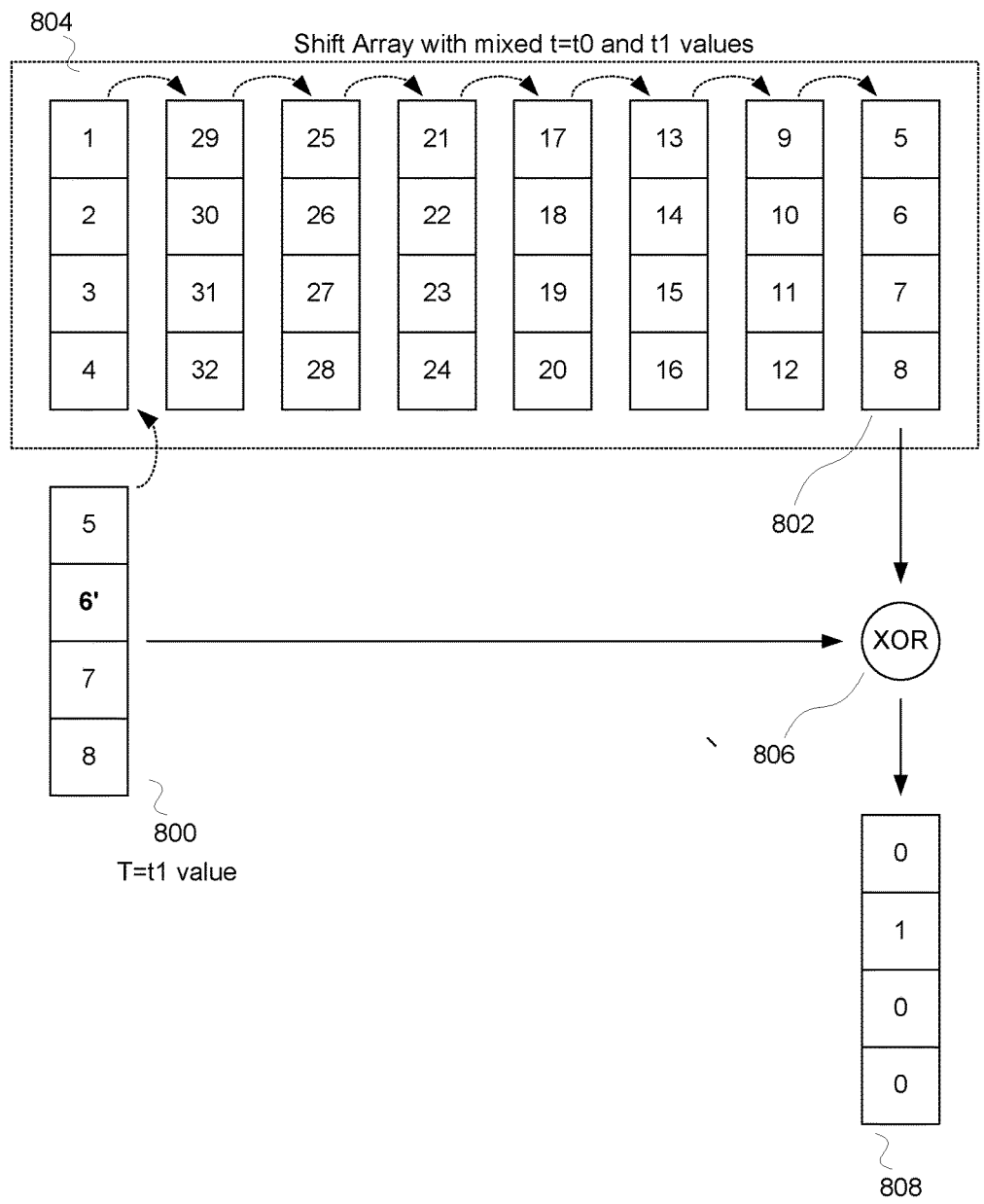
FIG. 8 is a block diagram illustrating an embodiment of a previous measurement comparer's operation.

FIG. 8 is a block diagram illustrating an embodiment of a previous measurement comparer's operation. In some embodiments, the operation shown in FIG. 8 is illustrative of the operation of previous measurement comparer 300 of FIG. 3. In the example shown, a set of data is received as input—in this Figure shown as column 800 of T=t1 value is input (the second column of T=t1) and it is compared (using parallel XOR 806) to the last column 802 of shift array 704. Shift array 804 inputs each column and these are shifted through shift array 804 until the column appears at the far right (in this case the $2^{nd}$ column of the quantum bit array at T=t0). The column when it arrives at the fir right is at the appropriate time to be compared to the corresponding input column of values taken from the same location in the quantum bit array, but at a later time. Output column 808 has a '0' value for no change and '1' for a change—in this case a '1' in the second position from the top corresponding to the changed bit '6" of the input column. The position in the output column with information regarding the associated quantum bit identifier and time can uniquely identify the changed bit in the quantum bit array of the quantum bit device. Shift array 804 is shown with position values of FIG. 6A associated with time=t0 and one column from T=t1.

Figure 9:
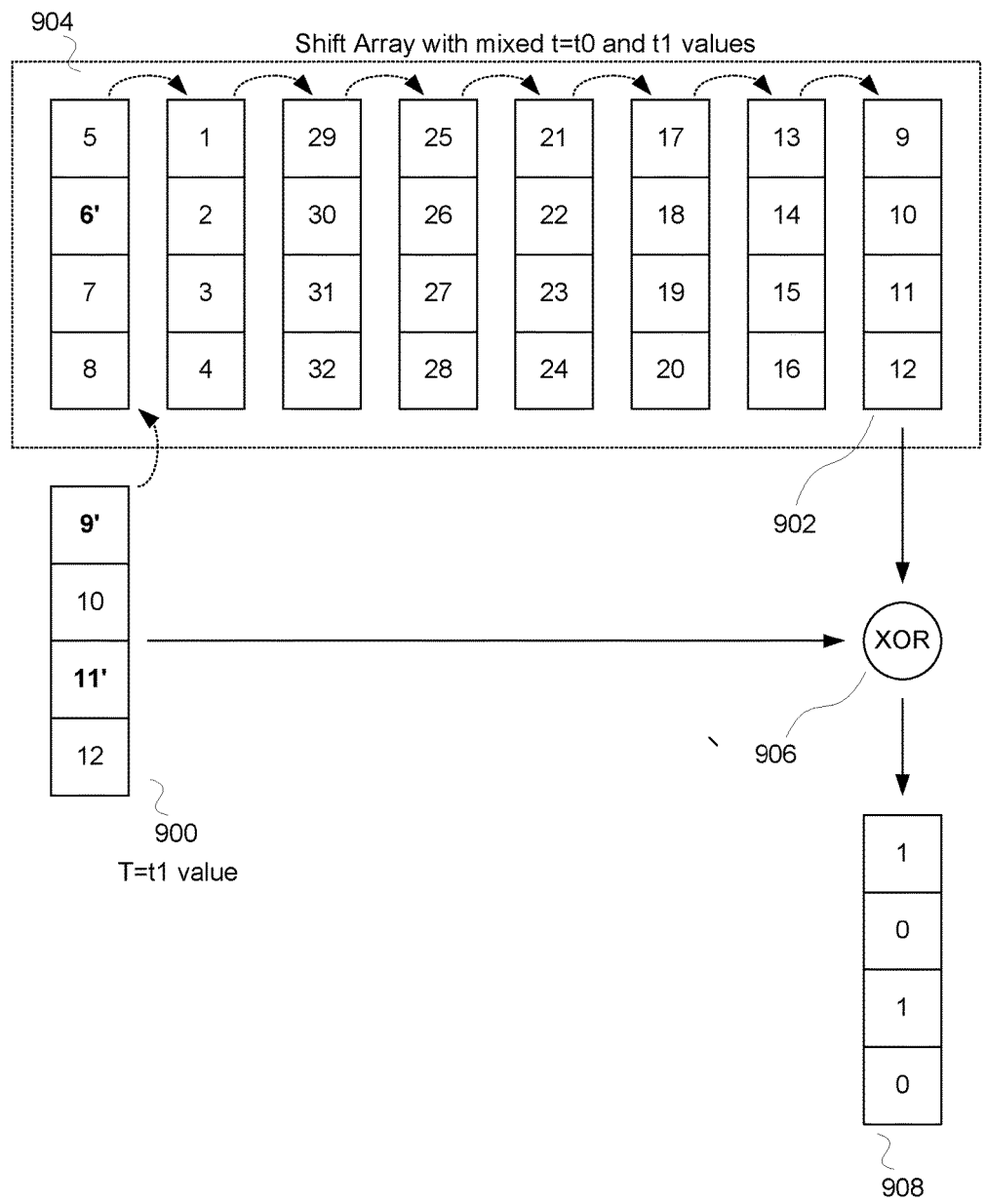
FIG. 9 is a block diagram illustrating an embodiment of a previous measurement comparer's operation.

FIG. 9 is a block diagram illustrating an embodiment of a previous measurement comparer's operation. In some embodiments, the operation shown in FIG. 9 is illustrative of the operation of previous measurement comparer 300 of FIG. 3. In the example shown, a set of data is received as input—in this Figure shown as column 900 of T=t1 value is input (the third column of T=t1) and it is compared (using parallel XOR 906) to the last column 902 of shift array 904. Shift array 904 inputs each column and these are shifted through shift array 904 until the column appears at the far right (in this case the $3^{nd}$ column of the quantum bit array at T=t0). The column when it arrives at the fir right is at the appropriate time to be compared to the corresponding input column of values taken from the same location in the quantum bit array, but at a later time. Output column 908 has a '0' value for no change and '1' for a change—in this case a '1' in the top position and the third from the top corresponding to the changed bits 9' and 11' of the input column. The position in the output column with information regarding the associated quantum bit identifier and time can uniquely identify the changed bit in the quantum bit array of the quantum bit device. Shift array 904 is shown with position values of FIG. 6A associated with time=t0 and two columns from T=t1.

In some embodiments, the input bits placed directly into the shift register and the first position of the shift register is compared to the last position in the shift register.

Figure 10:
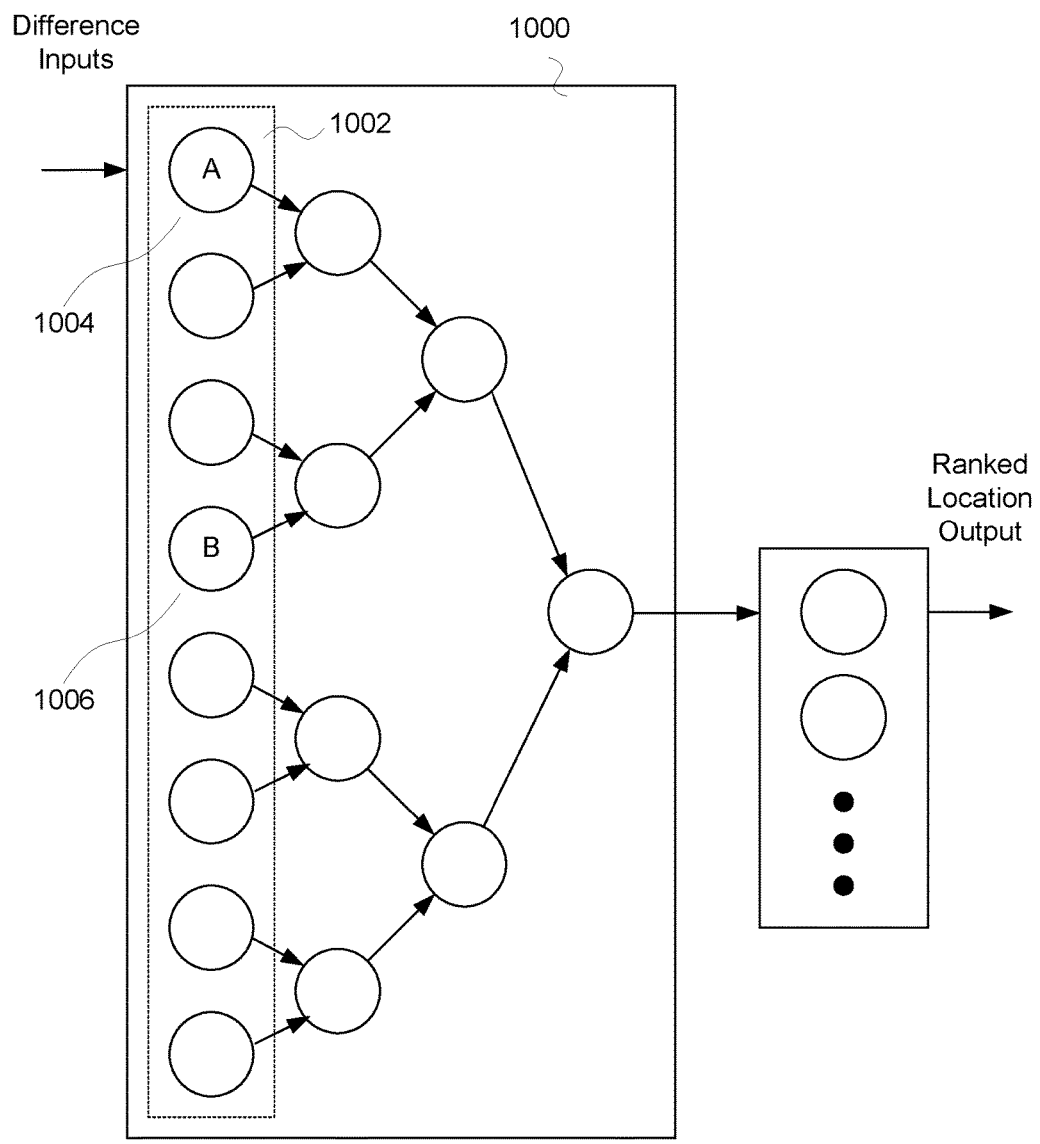
FIG. 10 is a diagram illustrating an embodiment of a binary tree and output.

FIG. 10 is a diagram illustrating an embodiment of a binary tree and output. In some embodiments, the operation shown in FIG. 10 is executed in a processing tree block of the difference location ranker (e.g., difference location ranker 400 of FIG. 4). In the example shown, difference inputs are fed into leaf nodes 1002 of binary tree 1000. The value stored in the leaf node is traceable to or helps point to the quantum bit location in the quantum bit array. There are 8 leaf nodes shown for leaf nodes 1002, but for an actual implementation the number of leaf nodes would correspond to the number of parallel bits input to binary tree 1000. In this case, node 1004 has value 'A' input indicating a difference associated with a first location in the quantum bit array and node 1006 has value 'B' input indicating a difference associated with a second location in the quantum bit array.

Figure 11:
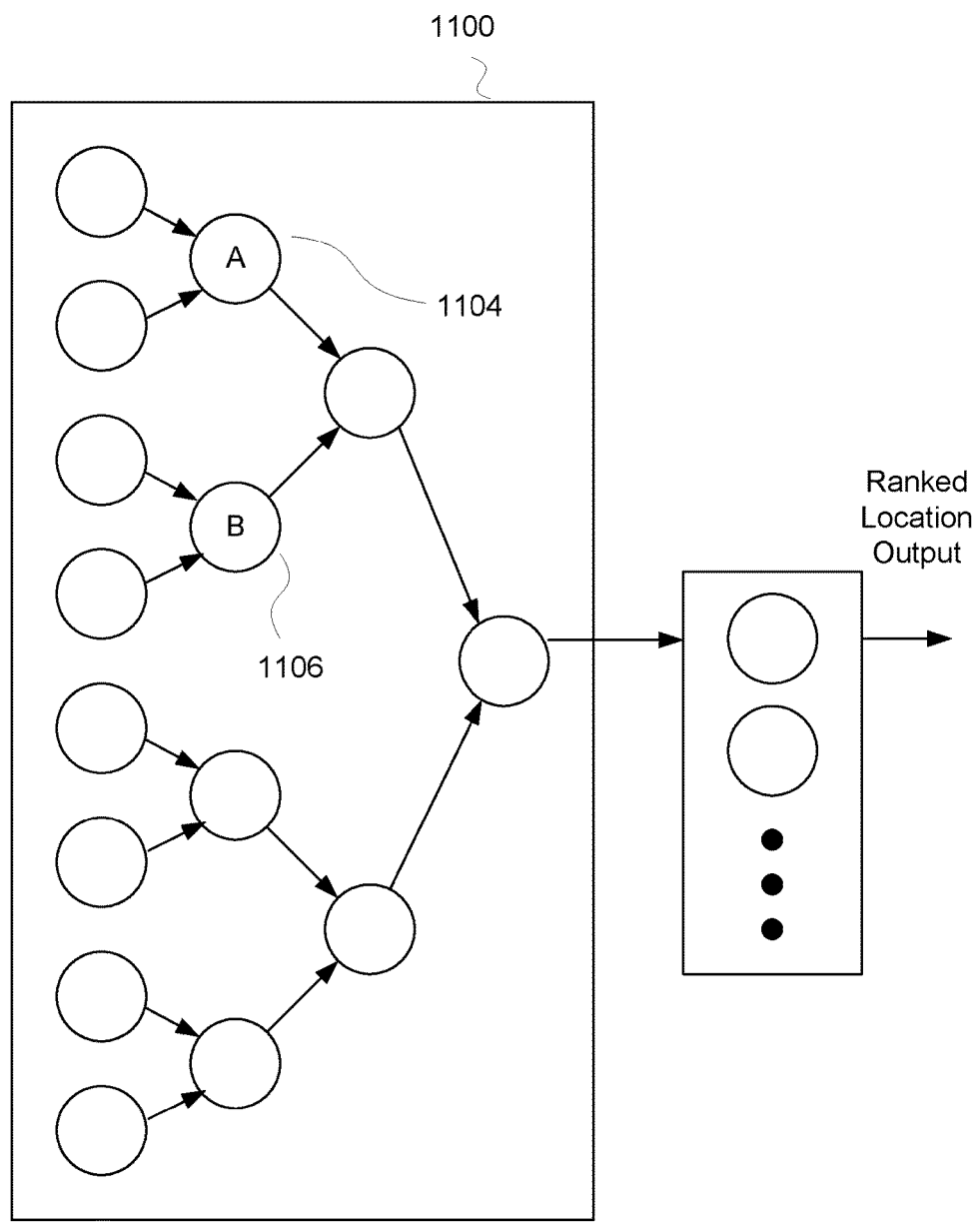
FIG. 11 is a diagram illustrating an embodiment of a binary tree and output.

FIG. 11 is a diagram illustrating an embodiment of a binary tree and output. In some embodiments, the operation shown in FIG. 11 is executed in a processing tree block of the difference location ranker (e.g., difference location ranker 400 of FIG. 4). In the example shown, binary tree 1100 can be either the same binary tree as FIG. 10 or a subsequent binary tree in a pipeline, which has received a copy of the state of the prior binary tree. Node 1104 has received the value 'A' as the rules for moving values through the tree on a clock cycle include moving the value to the right if the parent node is empty and there is no value in the other child node of the parent. Node 1106 has similarly received the value 'B' according to the same rules.

Figure 12:
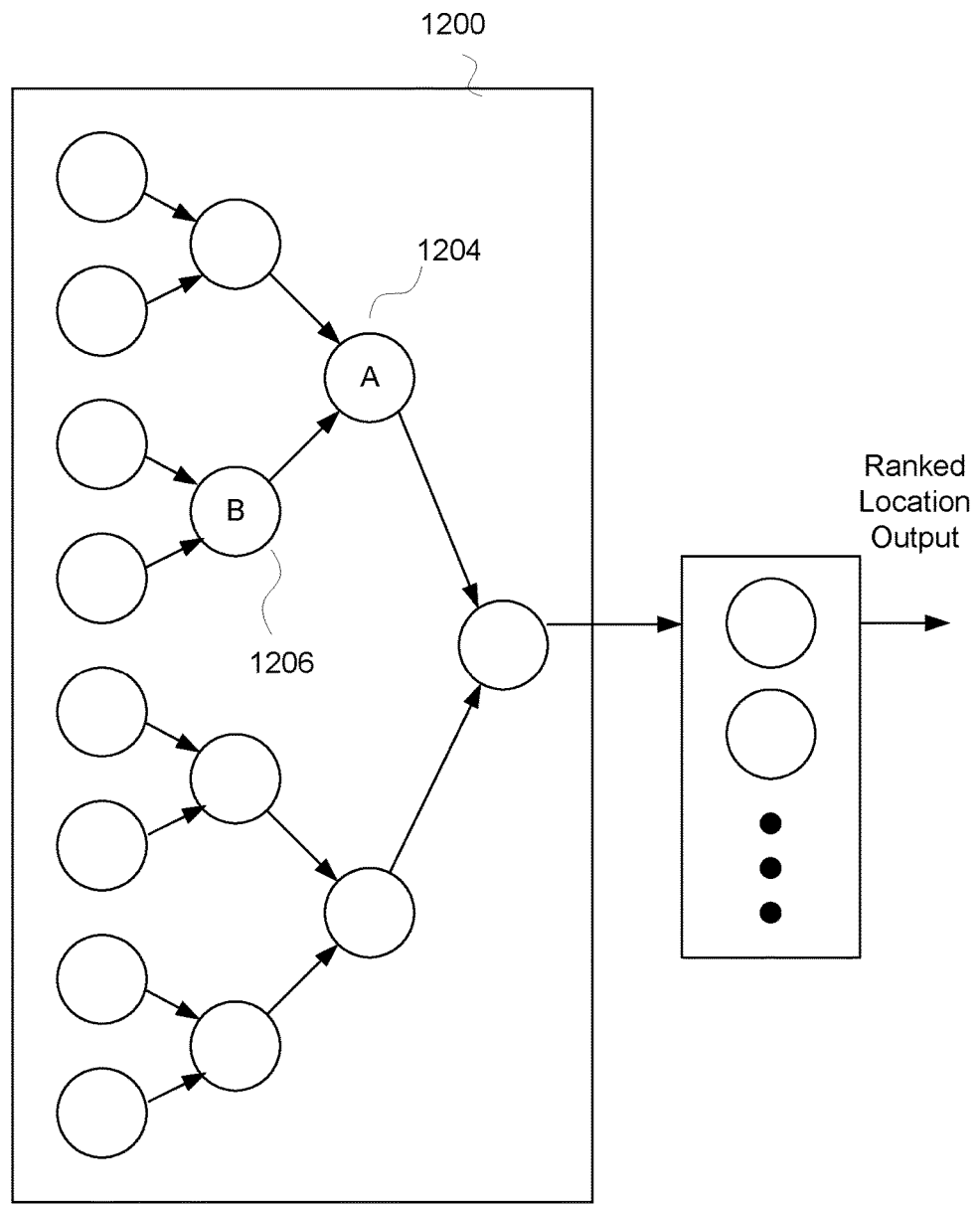
FIG. 12 is a diagram illustrating an embodiment of a binary tree and output.

FIG. 12 is a diagram illustrating an embodiment of a binary tree and output. In some embodiments, the operation shown in FIG. 12 is executed in a processing tree block of the difference location ranker (e.g., difference location ranker 400 of FIG. 4). In the example shown, binary tree 1200 can be either the same binary tree as FIG. 11 or a subsequent binary tree in a pipeline, which has received a copy of the state of the prior binary tree. Node 1204 has received the value 'A' as the rules for moving values through the tree on a clock cycle include moving the value to the right if the parent node is empty and it has priority if there is a value in the other child node of the parent. Node 1106 still holds the value 'B' because it does not advance if the sibling node has priority and advances to the shared parent node.

Figure 13:
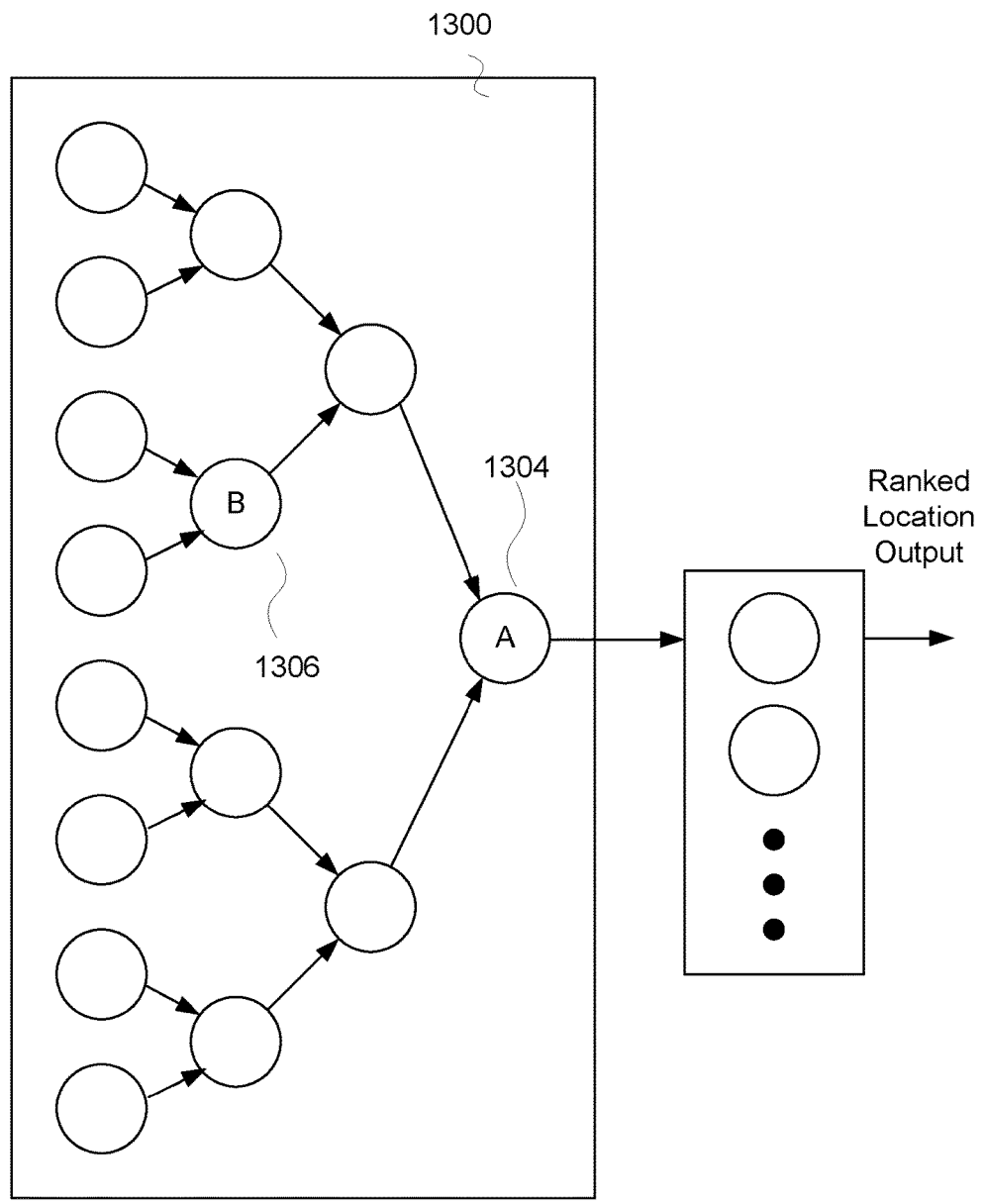
FIG. 13 is a diagram illustrating an embodiment of a binary tree and output.

FIG. 13 is a diagram illustrating an embodiment of a binary tree and output. In some embodiments, the operation shown in FIG. 13 is executed in a processing tree block of the difference location ranker (e.g., difference location ranker 400 of FIG. 4). In the example shown, binary tree 1300 can be either the same binary tree as FIG. 12 or a subsequent binary tree in a pipeline, which has received a copy of the state of the prior binary tree. Node 1304 has received the value 'A' as the rules for moving values through the tree on a clock cycle include moving the value to the right if the parent node is empty and if there is no value in the other child node of the parent. Node 1306 still holds the value 'B' because it does not advance if the parent was occupied.

Figure 14:
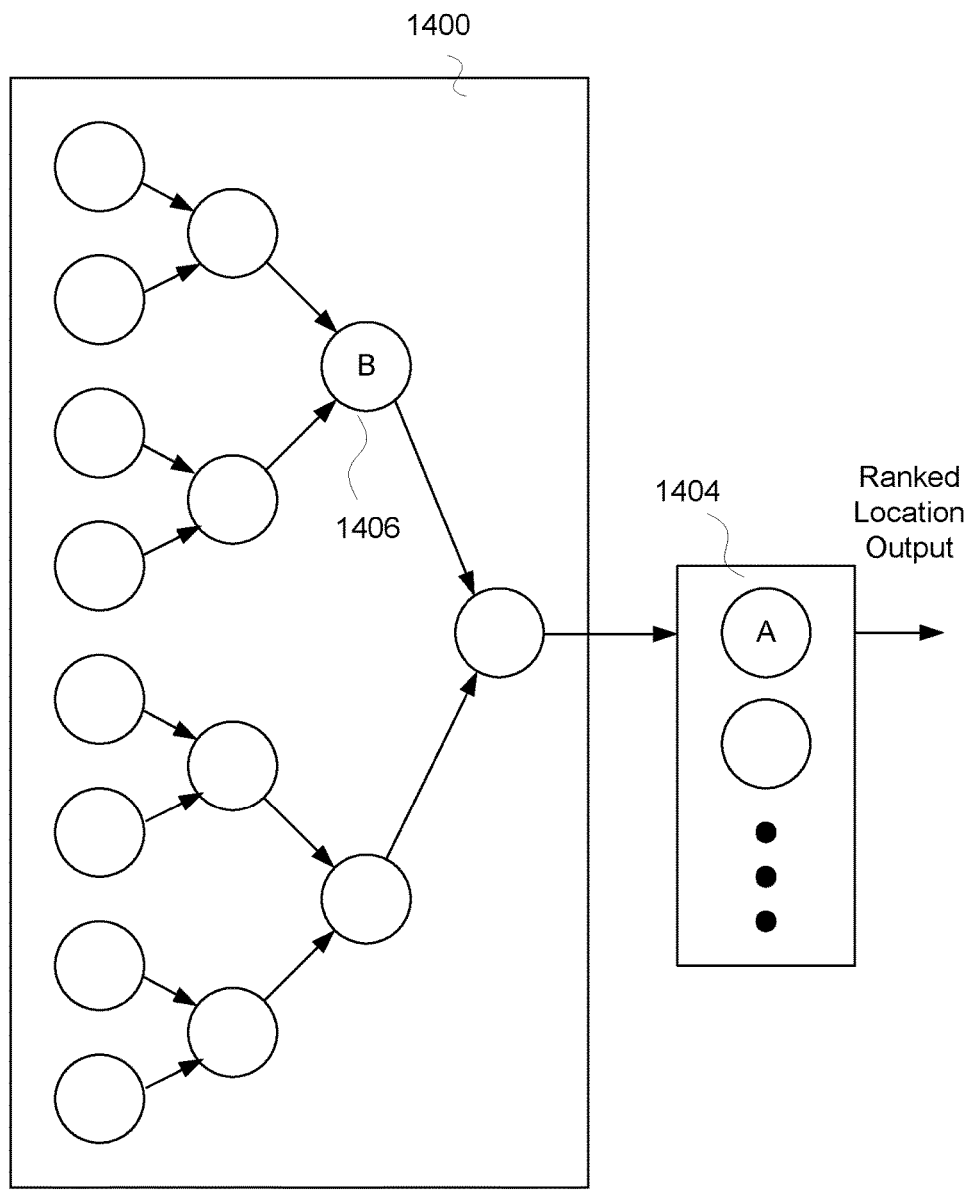
FIG. 14 is a diagram illustrating an embodiment of a binary tree and output.

FIG. 14 is a diagram illustrating an embodiment of a binary tree and output. In some embodiments, the operation shown in FIG. 14 is executed in a processing tree block of the difference location ranker (e.g., difference location ranker 400 of FIG. 4). In the example shown, binary tree 1400 can be either the same binary tree as FIG. 13 or a subsequent binary tree in a pipeline, which has received a copy of the state of the prior binary tree. Node 1404 has been output from binary tree 1400 and is placed to be output. In some cases, the first received output is placed at the top of the structure and the second received output is placed in the second from the top slot of the structure for outputting the values from the tree. The outputs can be serialized or put out in parallel. Node 1406 receives the value 'B' because it finally has the correct conditions to move to the right in the binary tree.

Figure 15:
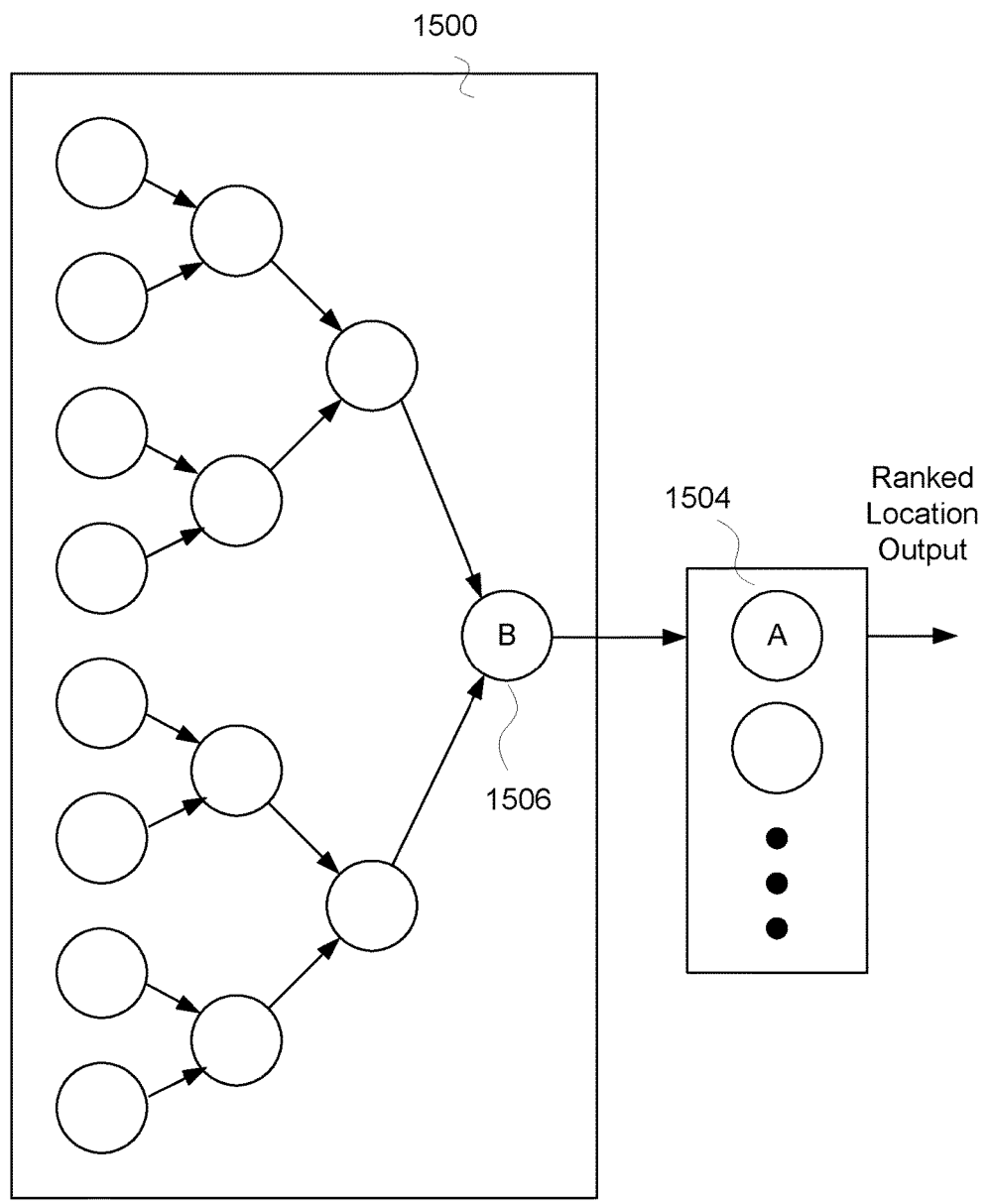
FIG. 15 is a diagram illustrating an embodiment of a binary tree and output.

FIG. 15 is a diagram illustrating an embodiment of a binary tree and output. In some embodiments, the operation shown in FIG. 15 is executed in a processing tree block of the difference location ranker (e.g., difference location ranker 400 of FIG. 4). In the example shown, binary tree 1500 can be either the same binary tree as FIG. 14 or a subsequent binary tree in a pipeline, which has received a copy of the state of the prior binary tree. Node 1504 has been output from binary tree 1500 and is placed ready to be output. Node 1506 receives the value 'B' because it finally has the correct conditions to move to the right in the binary tree.

Figure 16:
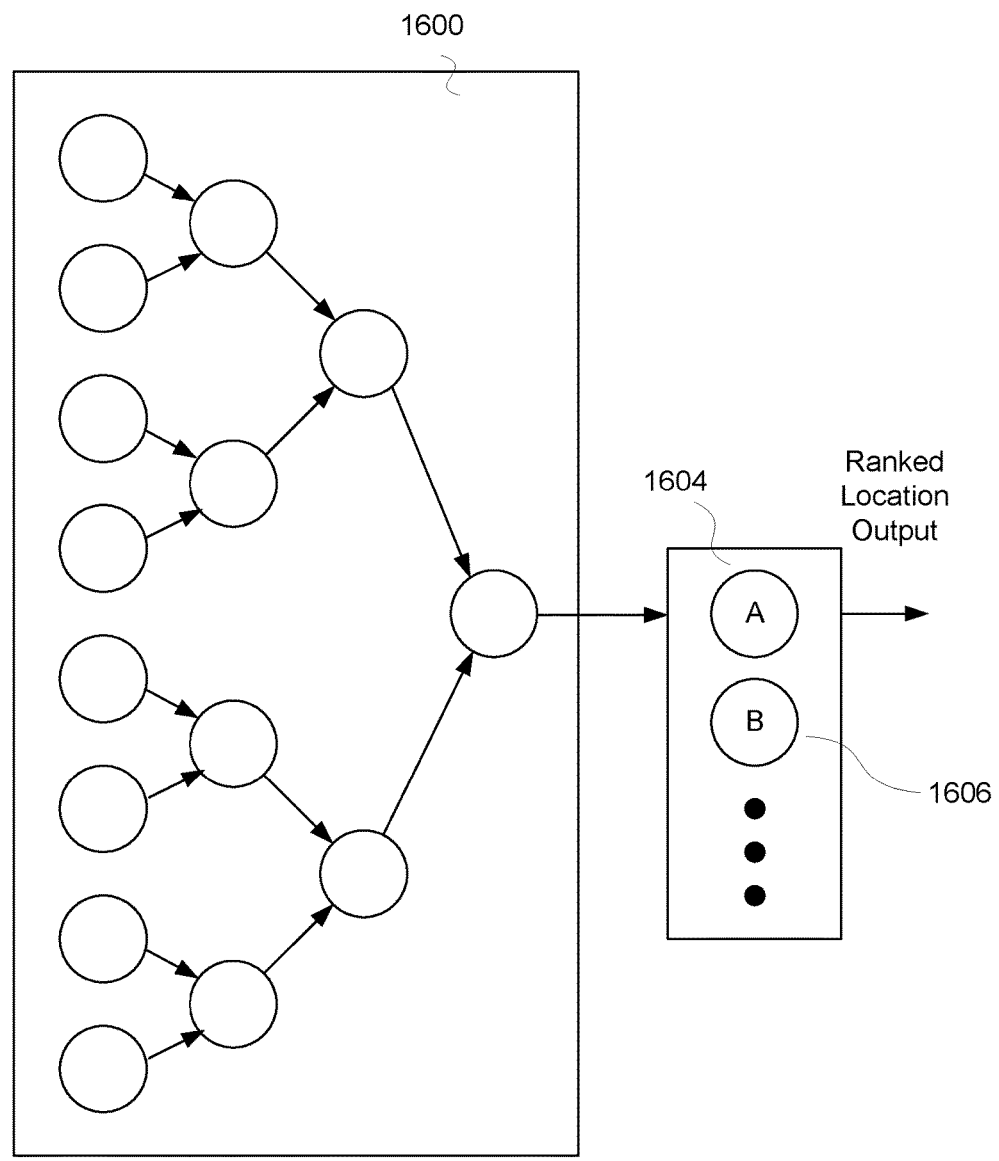
FIG. 16 is a diagram illustrating an embodiment of a binary tree and output.

FIG. 16 is a diagram illustrating an embodiment of a binary tree and output. In some embodiments, the operation shown in FIG. 16 is executed in a processing tree block of the difference location ranker (e.g., difference location ranker 400 of FIG. 4). In the example shown, binary tree 1600 can be either the same binary tree as FIG. 15 or a subsequent binary tree in a pipeline, which has received a copy of the state of the prior binary tree. Node 1604 has been output from binary tree 1600 and is placed to be output. Node 1606 has been output from binary tree 1600 and is placed to be output. The first received output is placed at the top of the structure and the second received output is placed in the second from the top slot of the structure for outputting the values from the tree. The outputs can be serialized or put out in parallel.

Figure 17:
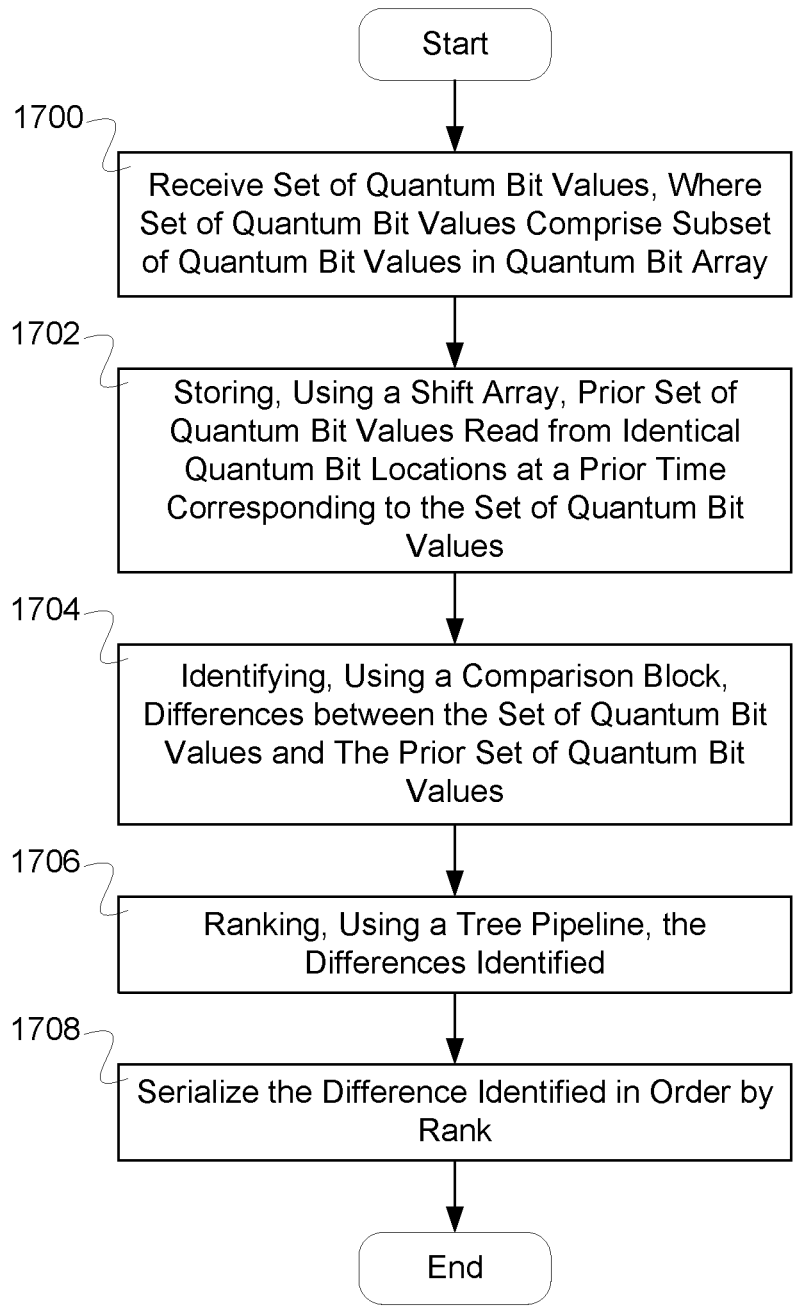
FIG. 17 is a flow diagram illustrating an embodiment of a process for locating errors for quantum computing.

FIG. 17 is a flow diagram illustrating an embodiment of a process for locating errors for quantum computing. In some embodiments, the process of FIG. 17 is implemented by error lister 108 of FIG. 1. In the example shown, in 1700 a set of quantum bit values is received, where the set of quantum bit values comprises a subset of quantum bit values in a quantum bit array. For example, the quantum bit array is read out in parallel using a bus of width k (the set of quantum bit values includes k values); the subset of k bits is read out the quantum bit array N×M/k times (if an integer) to read out the entire N×M quantum bit array. In 1702, a prior set of quantum bit values is stored using a shift array that is read from the identical quantum bit locations at a prior time corresponding the set of quantum bit values. For example, the quantum bit array is read out sequentially k bits at a time and these are piped into a shift register (the shift array shifts in the set of quantum bit values); when a set of k bits reaches the end of the shift register, the input set of k bits corresponds (bits read from the same locations in the quantum bit array, but read at different times) to that last k bits in the shift register and so can be compared. The shift register thus includes slots that can store at least the entries read between a prior read of a location in the quantum bit array and the current read of the quantum bit array. In some embodiments, the shift array stores at least j sets of quantum but values, where each nut location of the quantum bit array is stored in the j sets of quantum bit values. In 1704, differences are identified using a comparison block between the set of quantum bit values and the prior set of quantum bit values. For example, the values of the current input set of bits is compared (e.g., using a parallel XOR function) to the values of the prior set of bits at that location and difference between the two are identified. A parallel XOR operation can indicate a '1' where there are differences between the two bit values and a '0' when the two bit values are the same. In 1706, the differences identified are ranked using a tree pipeline. For example, the locations of any differences between bits should be sparsely distributed within any set of quantum bit values so that creating a short list of these values is important. A binary tree pipeline is used to gather the difference entries into a short list that is output in parallel or serially. A parallel output may be optimal for internal dedicated bus structure between the pipeline and an error correction determiner. A serial output may be optimal for error correction determiner that wants one error location indication at a time. The tree pipeline comprises a plurality of processing trees. The state of the tree pipeline is transferred from one processing tree to the next processing tree in the pipeline and each processing tree moves data within it according to one or more rules for moving data between the nodes. In various embodiments, the one or more rules comprise: moving a difference indication from a first child to the node that has the child, moving a difference indication from a second child to the node that has the child, prioritizing a move of a difference indication from a first child to the node that has the child if both children are occupied, moving a difference indication from the node with a child to a parent node if the parent is empty, etc. In some embodiments, the differences identified include a qubit identifier for each of the differences identified. In some embodiments, a corresponding location in the quantum bit array is determined using location information associated with an input array and the location information stored in the processing tree. In various embodiments, the tree pipeline indicates the difference indications are available because the tree is empty of entries, because the max number of cycles for movement has been accomplished, or any other appropriate terminating condition. In some embodiments, the number of difference indications is indicated (one, two, three, etc.). In some embodiments, the number of difference indication is not explicitly indicated. In 1708, the differences identified are serialized in order by rank. For example, the locations of the bits that have been identified as being different are output to an error correction module that can correct errors in the quantum bit array.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for locating errors for quantum computing, comprising:
    an interface configured to receive a set of quantum bit values, wherein the set of quantum bit values comprise a subset of quantum bit values in a quantum bit array;
    a shift array configured to store a prior set of quantum bit values read from identical quantum bit locations at a prior time corresponding to the set of quantum bit values;
    a comparison block configured to identify differences between the set of quantum bit values and the prior set of quantum bit values;
    a tree pipeline configured to rank the differences identified; and
    a serializer configured to serialize the differences identified in order by rank.

2. A system as in claim 1, wherein the set of quantum bit values includes k values.

3. A system as in claim 1, wherein the shift array stores at least j sets of quantum bit values.

4. A system as in claim 3, wherein each bit location of the quantum bit array is stored in the j sets of quantum bit values.

5. A system as in claim 1, wherein the shift array shifts in the set of quantum bit values.

6. A system as in claim 1, wherein a last shift register of the shift array stores the prior set of quantum bit values used for comparison with the set of quantum bit values received via the interface.

7. A system as in claim 1, wherein the comparison block compares using an XOR function.

8. A system as in claim 1, wherein the comparison block compares each of the set of quantum bit values in parallel.

9. A system as in claim 1, wherein the tree pipeline comprises a plurality of processing trees.

10. A system as in claim 1, wherein the differences identified include a qubit identifier for each of the differences identified.

11. A system as in claim 1, wherein the tree pipeline comprises a plurality of processing trees.

12. A system as in claim 11, wherein a first processing tree state is copied from a first processing tree of the tree pipeline to a second processing tree of the tree pipeline.

13. A system as in claim 12, wherein the first processing tree state is changed based on one or more rules.

14. A system as in claim 13, wherein the one or more rules comprises one of the following:
    moving difference indication from a first child or moving difference indication from a second child.

15. A system as in claim 1, wherein the tree pipeline indicates difference indication is available.

16. A system as in claim 15, wherein the difference indication can be indicated as available in the event that the input bits indicate no changes detected.

17. A system as in claim 1, wherein the tree pipeline has one difference indication available.

18. A system as in claim 1, wherein the tree pipeline has two difference indications available.

19. A method for locating errors for quantum computing, comprising:
    receiving a set of quantum bit values, wherein the set of quantum bit values comprise a subset of quantum bit values in a quantum bit array;
    storing, using a shift array, a prior set of quantum bit values read from identical quantum bit locations at a prior time corresponding to the set of quantum bit values;
    identifying, using a comparison block, differences between the set of quantum bit values and the prior set of quantum bit values;
    ranking, using a tree pipeline, the differences identified; and
    serializing the differences identified in order by rank.

20. A computer program product for locating errors for quantum computing, the computer program product being embodied in a non-transitory computer readable storage medium and comprising computer instructions for:
    receiving a set of quantum bit values, wherein the set of quantum bit values comprise a subset of quantum bit values in a quantum bit array;
    storing, using a shift array, a prior set of quantum bit values read from identical quantum bit locations at a prior time corresponding to the set of quantum bit values;
    identifying, using a comparison block, differences between the set of quantum bit values and the prior set of quantum bit values;
    ranking, using a tree pipeline, the differences identified; and
    serializing the differences identified in order by rank.

* * * * *